United States Patent Office 3,187,081
Patented June 1, 1965

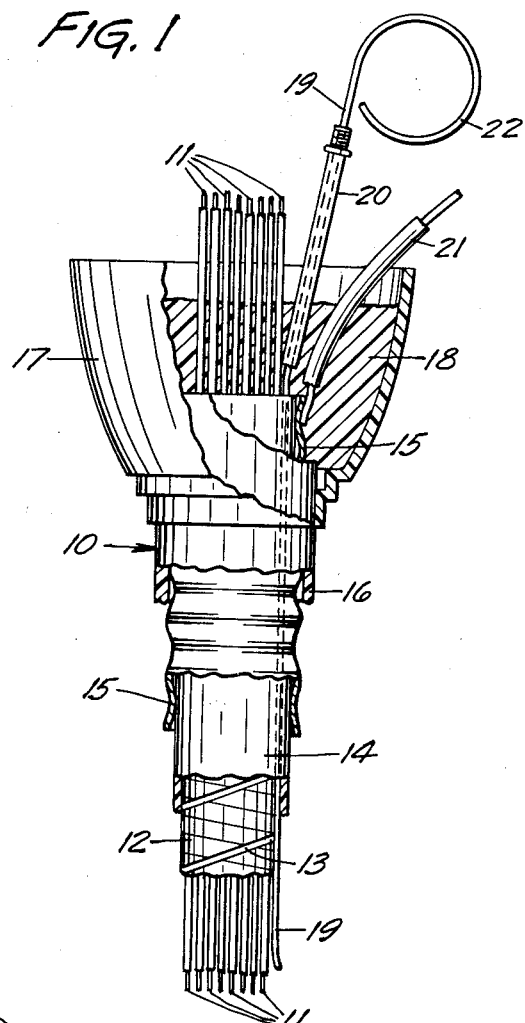
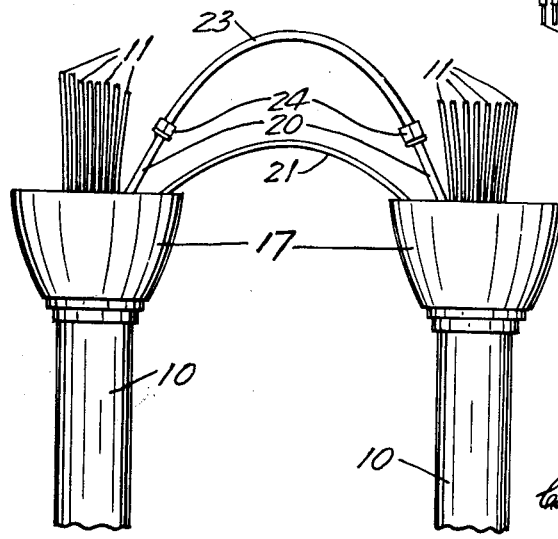

3,187,081
CABLE CONNECTION
Emil Wayne Bollmeier, St. Paul, Minn., assignor to Minnesota Mining and Manufacturing Company, St. Paul, Minn., a corporation of Delaware
Original application Jan. 19, 1962, Ser. No. 167,380. Divided and this application Mar. 25, 1963, Ser. No. 273,255
2 Claims. (Cl. 174—21)

This application is a division of application Serial No. 167,380 filed January 19, 1962, now Patent No. 3,150,221.

This invention relates to the connecting or splicing of segments of sheathed cables and has particular reference to the splicing of communications cables which are maintained under internal pneumatic pressure.

A typical form of telephone cable consists of a bundle of plastic-insulated small copper wires wrapped loosely with a spiraled or longitudinally lapped strip of plastic film and encased in a single- or double-walled rubbery or plastic sheath having a metal foil shielding member within the outer sheath or between the two. The cable is commonly laid underground, i.e. "direct buried," being brought up at intervals, for example to provide for splicing and for tapping of service wires at unpressurized road and access type pedestal cases. Entry of moisture into such cables causes degradation of electrical characteristics and must be avoided. To this end dry air is forced into the cable under pressure, and the pressure is continuously maintained. It is essential that adjacent cable-lengths be pneumatically inter-connected, e.g. at splice and termination points, so that the air pressure may be maintained throughout the entire cable.

Prior methods of gas-plugging the cable ends with self-hardening liquid resins and of forming pneumatic connections between cable-ends have been less than fully satisfactory for a variety of reasons. Methods requiring perforation of the outer sheath have frequently resulted in damage to the inner conductors. Methods involving end-wise insertion of permanent connecting tubes into the wire-bundle have likewise resulted in wire damage, or in ineffective flow of air pressure; or the method has been difficult to practice due to the limited space available.

The present invention avoids these and other defects and disadvantages of the prior art. There is provided a novel method for simultaneously sealing and channeling cable-ends which is rapidly and efficiently followed without special training and with no danger of damage to cable components, and in which are employed novel means for providing pneumatic connection with the cable interior.

The practice of the invention will now be described in terms of the formation of an end seal in a plastic insulated telephone cable as illustrated in the accompanying drawing, in which FIGURE 1 is an elevation of an end seal area with portions cut away to show interior detail, and FIGURE 2 illustrates the pneumatic interconnection of adjacent sealed cable-ends.

The cable 10 is illustrated as consisting of a bundle of plastic-coated copper wires 11 spirally wrapped with an overlapping strip of transparent plastic film 12 held loosely in place by a cord of untwisted filaments 13, the whole being contained within an inner plastic sheath 14, a rolled and longitudinally lapped fluted copper shield 15, and an outer plastic sheath 16. It will be appreciated that the number of wires 11 is reduced for clarity of illustration; a cable of the structure shown and having an outer diameter of approximately ¾ inch may contain, for example, 18 pairs of color-coded polyethylene-coated No. 24 copper wires.

An open-ended conical container 17 is first placed over the end of the cable. The smaller open end of the container fits snugly onto the outer sheath 16 and is slidable thereon. A terminally exteriorly threaded tubular metal tap 20, about ¼ inch in diameter and 2½ inches in length, and which may optionally be knurled or otherwise roughened over its remaining length, is placed over an elongate moderately curved wire probe 19 the forward portion of which is then inserted within the open end of the cable, e.g., between the plastic film 12 and the inner sheath 14 of the cable as shown, or, in a loosely packed cable, centrally of the bundle of wires. The end of the tap 20 is located close to, but not necessarily in contact with, the end of the cable sheath. A wire 21 is connected to the shield 15 either by soldering or by suitable clip means. The container 17 is then slid into position at the end of the sheath as shown, and an encapsulating self-curing liquid resin is poured into the container and permitted to harden, forming the insulating and sealing resinous filler 18. The resin penetrates around and along the individual wires 11, and around the probe 19 and between the sheath 14 and film 12, but to a distance somewhat short of the end of the probe, and sufficient resin is supplied to cover a substantial portion of the length of the tap 20.

In place of the slidable one-part container 17 it will be appreciated that a split mold of the same general shape may be used, the segment being snapped or otherwise held together around the previously prepared cable-end; or the one-piece mold may be applied after the probe member is in place provided the mold opening will pass over the added components.

After the resin has hardened, the probe 19 is twisted to and fro by means of the handle 22 until it is broken loose from the surrounding resin. It is then withdrawn, leaving an open channel to the sealed interior of the cable 10 from the threaded tap 20. Pneumatic interconnection between cable-ends is then easily accomplished by means of flexible hose 23 fitted at both ends, with appropriately threaded couplings 24 for connection to the terminally threaded taps, or with other connecting means where non-threaded taps are employed. The wire-ends are connected or tapped as desired, the ground connection is completed through conductor 21, and the entire connection enclosed in a weather-tight junction box or other protective covering.

An effective probe for use with an 18-pair cable as herein described is prepared from a section of steel piano wire of about 2 mm. (.090 inch) diameter and about 10 inches in length, moderately uniformly curved to a radius of about one foot. The leading end of the probe is smoothly rounded to avoid any cutting or tearing of insulation during insertion into the cable. The wire is lightly wiped with a resin-resistant lubricant, preferably a silicone oil or grease, for ease in removal and for rust prevention prior to use. The wire is curved sufficiently to position the tap at an angle to the cable axis but not enough to cause any difficulty either in placing the probe in the cable-end or in later withdrawing it from the tap.

An effective resinous encapsulating composition consists of a self-curing mixture of liquid epoxy resin, liquid polysulfide polymer, and liquid amine catalyst. Typical compositions and means for mixing have been described, for example in my U.S. Patent No. 2,877,288 wherein is illustrated another means of forming a pneumatic connection between electrically connected sheathed cables. The components are mixed together just prior to application, to form a penetrating but moderately viscous liquid which rapidly cures to a strongly adherent tough and leakproof insulating resin.

The tap 20 fits loosely over the probe 19 and the resin rises within it to essentially the same level as within the container 17. The outer surface of the tap is securely gripped by the resin 18 so that the twisting force required to loosen the probe is insufficient to cause any loosening of the tap within the encapsulating resinous mass. Pre-formed plastic or resinous taps may be substituted for the metal tap 19. Although taps and probes of larger diameter may be used with larger cables, it is equally effective, and usually preferable, to employ instead a plurality of parts of the size indicated, the probe being of approximately the same diameter as the insulated wires of the cable and accordingly fitting alongside such wires in the wire-bundle, and outside of the plastic film 12, without developing any deleterious strains. Smaller components may be used but the size indicated is preferred as providing adequate air flow together with sufficient strength for easy removal of the probe.

The effort required to release and remove the probe is surprisingly small in view of the known strength of bond attained with the preferred resinous encapsulating agents. The release coating of silicone or other grease is partly responsible, and the slight rubberiness or stretchability of the resin is also believed to play a significant part. In any event, it is found possible to release and remove the probe by simple hand twisting and pulling after the resin has completely cured, leaving a permanent effective pneumatic connection to the interior of the otherwise hermetically sealed cable segment.

What is claimed is as follows:

1. A terminally gas-plugged shielded and sheathed communications cable having a large number of small insulated wires compactly bundled together within an enclosing insulating film, an intermediate closely fitting surrounding flexible metal shield, and a closely fitting outermost plastic sheath; said film, shield and sheath terminating within a close-fitting outwardly flaring open-ended container, the free ends of the said wires extending beyond the open end thereof; a mass of resinous filler filling the closed end of said container, surrounding said wires in a zone adjacent the closed end of said container, and plugging the cable against passage of gas therethrough; at least one elongate tubular tap terminally embedded and sealed within said mass of resinous filler and supported thereby; the resinous filler having an elongate narrow opening therethrough interconnecting the interior of said cable and the tubular tap.

2. A communications system comprising a series of cable segments having a large number of terminally interconnected and exteriorly connected small insulated wires compactly bundled together in each of said segments within an enclosing closely fitting flexible covering comprising a wrapping of insulating film, a wrapped thin metal shield, and a tubular plastic sheath, said covering terminating at each end of each segment within a close-fitting outwardly flaring open-top container, the wires at each said end extending beyond the flared open end of said container; a mass of resinous filler filling the closed end portion of each said container, surrounding the wires, and plugging the cable against passage of gas; an elongate tubular tap terminally embedded and sealed within each said mass of resinous filler and supported thereby; said mass having an elongate narrow opening therethrough interconnecting the interior of said cable section and the tubular tap; and flexible tubing interconnecting the taps of adjacent cable-ends within said system to provide continuous pneumatic interconnection along the said system.

References Cited by the Examiner
UNITED STATES PATENTS
2,711,438   6/55   Bissell _____ 174—77 X FOREIGN PATENTS
1,059,527   6/59   Germany.

E. JAMES SAX, *Primary Examiner.*

JOHN P. WILDMAN, LARAMIE E. ASKIN, *Examiners.*